Patented Mar. 23, 1937

2,074,885

UNITED STATES PATENT OFFICE 2,074,885

CARBON BODY

Harry Bender, Antioch, Calif., assignor to Great Western Electro-Chemical Company, a corporation of California No Drawing. Original application September 17, 1934, Serial No. 744,337. Divided and this application March 15, 1935, Serial No. 11,251

8 Claims. (Cl. 91—68)

This invention relates to the manufacture of dense, substantially impervious bodies of carbon, graphite or carborundum. Such bodies are useful for gas reactions, to provide a reaction chamber, for commutator brushes and various other uses requiring dense, compact bodies of low porosity and resistant to fracture.

This is a division of my application Ser. No. 744,337 filed Sept. 17, 1934.

It is an object of this invention to provide a substantially impervious body of graphite, carbon, carborundum and the like.

Another object of this invention is to provide a method for the manufacture of bodies of low porosity.

Another object of this invention is to provide a method for the manufacture of chlorination reaction chambers of an inert nature insofar as effect on the reaction is concerned.

The invention possesses other features and objects of advantage some of which with the foregoing will appear hereinafter wherein I have set forth the present preferred method of practicing my invention.

As a result of considerable research I have found that porous bodies such as carbon, graphite and carborundum can be made substantially impervious by impregnation with a silicate and this by an impregnation extending through the entire body. If one attempts to force a silicate through a pervious body by the use of high pressure it will be found that the impregnation is only a skin. A body so impregnated does not carry a uniform impregnation and if the surface is slightly abraded the effect of the treatment is lost. In accordance with this invention the impregnation is entire and uniform throughout the body.

I proceed by first heating the body to burn out or volatilize all oil, grease, wax and other volatile bodies. I then establish a flow through the article of a liquid stream so that the whole article is wet clear through. In practice I have started with water or a very dilute silicate solution and then gradually increased the concentration until one of high concentration was passing through the article. After this, the article is dried, being finally heated to above the temperature at which it will be used; the drying is conducted slowly so as not to crack the article. The article is then treated to remove metal impurities, particularly iron. To accomplish this I usually pass hot, dry chlorine (about 360° C.) through the article. This carries off the metals as volatile chlorides.

In case a material other than chlorine is used, it is well to pass that material through to remove any volatile metal salts that might form during later use.

The perferred silicate is a sodium silicate although other silicates recognized as equivalents in the silicate industry can be employed. In the claims, graphite, carbon and carborundum are within the term carbon body. The carbon bodies which I contemplate impregnating are, I have found, sufficiently adsorbent when dry to abstract water from the silicate solution and thus "set" the silicate so that its forms an impregnable film or skin on the body which prevents further impregnation with the silicate solution. Now when I initially use a very dilute solution the same action occurs, insofar as water abstraction is concerned, but because so little silicate is present, it does not set. When the body has finally been wet with water, by passing through the dilute solution or otherwise, then the concentrated silicate can be passed through without the undesirable skin forming in the interior of the body.

The hot dry chlorine can be suitably conducted to the carbon body in conduits made of a suitable material, as glass or a ceramic.

I claim:

1. A method for reducing the porosity of a carbon body comprising establishing a flow of a dilute silicate solution through said body and increasing the concentration thereof until finally a concentrated solution is employed.

2. A method for reducing the porosity of a carbon body comprising establishing a flow of a dilute silicate solution through said body to impregnate said body and then displacing said dilute solution with one of a higher concentration.

3. A method for reducing the porosity of a carbon body comprising establishing a flow of a dilute silicate solution through said body to impregnate said body and then displacing said dilute solution with one of a higher concentration and finally drying the silicate impregnated body.

4. A method of treatment for a carbon body comprising freeing said body of oils and fats, flowing a stream of a silicate solution through said body to impregnate said body substantially uniformly throughout, and drying said impregnated body.

5. A method of treatment for a carbon body comprising freeing said body of oils and fats, flowing a silicate solution through said body to impregnate said body, drying said impregnated body and removing metals from said body.

6. A method of treatment for a carbon body comprising flowing a stream of a silicate solution through said body to impregnate said body substantially uniformly throughout, and drying said impregnated body.

7. A method of treatment for a preformed carbon body comprising impregnating said preformed body substantially uniformly with a silicate solution, drying said body, and subjecting said impregnated body to the action of hot dry chlorine.

8. A method of treatment for a preformed carbon body to be used as a chemical reaction apparatus comprising impregnating said body with a filling material to fill substantially all voids in said body and passing a stream of substantially dry chlorine at about 360° C. over a surface of said body to be exposed to said chemical reaction.

HARRY BENDER.